Oct. 2, 1962 T. E. LOHR 3,056,884
WELDING METHOD
Filed Jan. 4, 1960
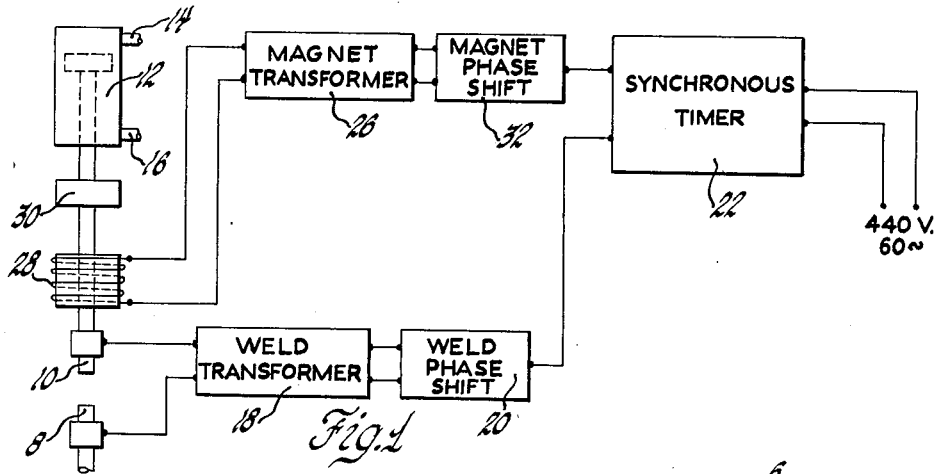
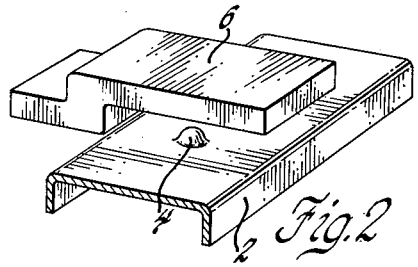
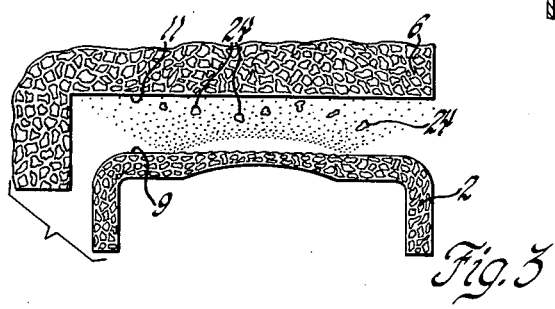
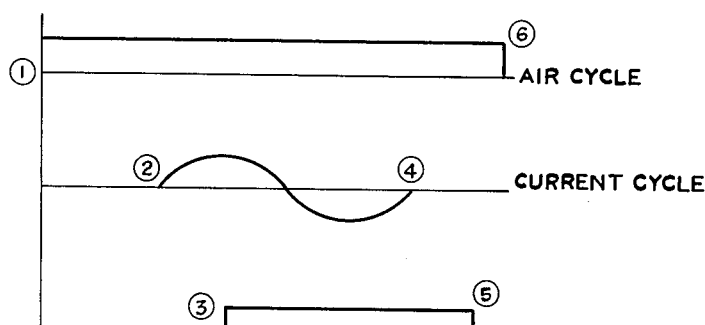
INVENTOR.
*Thomas E. Lohr*
BY
*Robert E. Fowler*
ATTORNEY

United States Patent Office 3,056,884
Patented Oct. 2, 1962

3,056,884
WELDING METHOD
Thomas E. Lohr, Detroit, Mich., assignor to General Motors Corporation, Detroit, Mich., a corporation of Delaware
Filed Jan. 4, 1960, Ser. No. 222
2 Claims. (Cl. 219—93)

This invention relates to a method for welding dissimilar metals together which have different melting points, for example, stainless steel and zinc die cast metals which in the past have been considered unweldable.

It is an object in making this invention to provide a novel method by which satisfactory welds can be obtained between dissimilar metals having widely varying characteristics.

It is a further object in making this invention to provide a method for satisfactorily welding together such metals as stainless steel and zinc die cast metal.

It is a further object in making this invention to provide a novel welding method for welding together dissimilar metals that will not disfigure visible surfaces adjacent the weld locale when the parts are relatively thin.

With these and other objects in view which will become apparent as the specification proceeds, my invention will be best understood by reference to the following specification and claims and the illustrations in the accompanying drawings, in which:

FIG. 1 is a combination block and schematic diagram of a welding system incorporating my invention;

FIG. 2 is a perspective view showing two parts of dissimilar metals in spaced relation prepared for welding;

FIG. 3 is a diagrammatic, enlarged section through the weld area during welding to illustrate one step in the welding process; and, FIG. 4 is a graph showing the phase relationship between the clamping means and current applications in the welding cycle.

As is well known, it has previously been the common belief that it is not possible to weld together metals having widely differing characteristics and different melting points such, for example, as stainless steel and die cast metal. Furthermore, another complicating factor is the size and thickness of the parts which it is desired to join. As an example of one problem which the current method is capable of solving is that of the application of a die cast pivot bracket having a substantial thickness to a thin channel of stainles steel which supports a pane of glass for an automobile window. The theory behind applicant's method is to place the two parts that are to be welded in juxtaposition but with their parallel surfaces slightly spaced apart and held in such spaced relation by a small raised projection on one part. This small projection is the only current path between the two parts and when a heavy current is applied the material in this small projection fairly explodes coating the two surfaces that are adjacent each other with a layer of molten metal. At the same time this heat causes the surfaces to become molten to a depth of about one micron. The two surfaces are then quickly brought into contact while in this state and the molten metal solidifies to complete the weld. Micro-photographs have been taken through sections of welds produced by this method and show penetration of opposite surfaces to give good adherence.

To illustrate the application of this method reference is first made to FIG. 2 in which there is shown a section of a channel 2 of a thin stainless steel frame which might be placed around a glass window in an automotive vehicle. This frame is provided with a small projection 4 for purposes of providing a conductive path as previously explained and it is desired to weld the upper surface of the channel 2 to the lower surface of the bracket 6. These two parts are, therefore, clamped in a welding machine between electrodes 8 and 10, as shown in FIG. 1, by the application of compressed air to the cylinder 12 through the supply lines 14, 16. This pressure is just sufficient to hold the two in spaced relation and not sufficent to crumple the projection 4 or force it into the metal of the bracket 6. A welding transformer 18 is connected to the electrodes 8 and 10 and supplies them with welding current. The transformer is in turn connected to an adjustable phase shift control 20 which can be adjusted by the operator to provide heat control in the amount of cyclic energy applicable to the weld. The weld phase shift control is in turn connected to a common synchronous timer 22 fed from a source of conventional commercial power. For this portion of the circuit let it be assumed that the operator wishes to utilize only half of the available heat present in each cycle and so sets his phase shift control 20 as that the transformer is not energized until each half cycle of current is half over. By this method, each time the synchronous timer switches on the phase shift will only cause energization of the transformer for the last half of each cycle applied which will cut the total amount of heat available in each half cycle in half.

With the parts in position clamped between the electrodes 8 and 10 by pressure in air cylinder 12 the required potential is then applied to the transformer 18 and the current is sufficently concentrated and strong to cause the projection 4 to practically explode in small particles, such as shown diagrammatically at 24 in FIG. 3, leaving the upper surface of the channel 2 flat and a layer of molten material on each of the adjacent faces of the parts 2 and 6. At this critical time a signal is sent through the magnet transformer 26 to energize the clamping coil 28 which pulls down on armature 30 on the electrode shaft 10 to apply added pressure to the two parts and to suddenly bring the two faces 9 and 11 into close contact. The exact moment of application of this force is critical and that is controlled by a phase shift control 32 connected between the transformer 26 and the main synchronous timer 22.

Referring now to FIG. 4 there is shown therein the related time cycles of the various portions of the apparatus on a general time base. For example, at point ① the air is applied to the cylinder 12 as shown in the upper graph labeled "Air Cycle" and that is maintained on until at some later point. The current is next applied at point ② as shown on the second line labeled "Current Cycle" and then after current application and the burning off of the projection and providing of thin molten surfaces, the magnet is energized at point ③ as shown on the last line labeled "Magnet Cycle." The current may then be cut off at point ④, next the de-energizing of the clamping magnet 28 at point ⑤, and lastly the air cylinder released at point ⑥ so that the welded materials can be removed from the jaws of the welder.

One of the advantages of this method is the ultra-thin layer of molten material produced on the opposite faces to be welded by this method prior to bringing the parts together to form the weld. As stated above it is believed that penetration of this layer is of the order of one micron and, of course, this prevents a sufficent amount of heat from penetrating through a part to burn any plated surface on the opposite side so the weld is practically unmarked by the application of heat thereto.

While it is necessary to run through one or two sample welds for testing any particular configuration or materials before welding in large numbers to make sure that the proper timing is applied, it might be mentioned that in welding such devices as have been taken as illustrative here, it has been found that a phase shift setting on the weld phase shift control 20 of 15% and a magnetic phase shift 32 of 56% have proved satisfactory under certain conditions. This is illustrative only and is not intended to be limiting in any manner.

What is claimed is:

1. A method of welding together parts of dissimilar metals including the steps of clamping together the parts with a certain predetermined pressure, said parts only physically contacting over a small area but being maintained in spaced relation over the remainder of their contiguous faces which it is desired to weld, applying electrical power to the parts sufficent to burn off the small area of contact and convert it into molten metal vapor to coat a substantial area of the two contiguous faces, applying additional pressure at the instant the faces are coated with molten metal vapor to bring the faces into firm contact and holding the parts together until solidification of the surfaces takes place to complete the weld.

2. A method of welding together parts of dissimilar metals having different melting points including the steps of providing a projection on one face of one of the two parts, holding the parts in juxtaposition with the projection on the one part pressing against the surface of the other and providing the only conductive path between the two, applying electrical power of sufficient intensity to convert said projection into molten metal vapor which coats a substantial area of the contiguous faces of the parts to provide a thin molten metal vapor layer on each surface, applying additional pressure to the parts to bring them into close contact while the two faces are coated with molten metal vapor and holding the parts firmly together until the surfaces are joined.

References Cited in the file of this patent

UNITED STATES PATENTS

| | | |
|---|---|---|
| 846,480 | Lackman | Mar. 12, 1907 |
| 1,977,567 | Eksergian | Oct. 16, 1934 |
| 2,021,173 | Clark | Nov. 19, 1935 |